United States Patent [19]
Stanley et al.

[11] Patent Number: 5,845,140
[45] Date of Patent: Dec. 1, 1998

[54] METHOD AND APPARATUS FOR ENSURING CPU HALTS DURING IDLE PROCESSING

[75] Inventors: James C. Stanley, Portland; Dan H. Nowlin, Jr., Hillsboro, both of Oreg.

[73] Assignee: Intel Corporation, Santa Clara, Calif.

[21] Appl. No.: 804,137

[22] Filed: Feb. 20, 1997

[51] Int. Cl.$^6$ .................................................. G06F 1/32
[52] U.S. Cl. ............................. 395/750.06; 395/750.05; 395/750.01
[58] Field of Search ...................... 395/750.01, 750.05, 395/750.06, 670; 364/707

[56] References Cited

U.S. PATENT DOCUMENTS

| | | | |
|---|---|---|---|
| 5,355,501 | 10/1994 | Gross et al. | 395/750.05 |
| 5,590,342 | 12/1996 | Marisetty | 395/750.06 |
| 5,655,126 | 8/1997 | Glenning | 395/750.06 |
| 5,708,808 | 1/1998 | Shoichi | 395/678 |

*Primary Examiner*—Gopal C. Ray
*Attorney, Agent, or Firm*—Blakely, Sokoloff, Taylor & Zafman LLP

[57] ABSTRACT

A method for managing idle processing in a computer system is described. An Idle Chain Manager virtual device driver (VxD) address is registered on an idle callback chain on the computer system. An Idle Chain Manager callback function corresponding with the Idle Chain Manager VxD address is hooked with a registration service on the computer system. This allows the Idle Chain Manager callback function to intercept a request from a VxD to register a VxD idle callback address onto the idle callback chain and registers the VxD idle callback address with the Idle Chain Manager callback function. The Idle Chain Manager VxD address is called when the idle processing is required.

23 Claims, 6 Drawing Sheets

METHOD AND APPARATUS FOR ENSURING CPU HALTS DURING IDLE PROCESSING

FIELD OF THE INVENTION

The present invention relates generally to the field of CPU power management. More specifically, the present invention relates to a method and apparatus for managing idle processing activities in a computer system to reduce power consumption by the CPU.

BACKGROUND OF THE INVENTION

In order to conserve power consumed by the CPU, the Windows® 3.1/95 operating system puts the CPU in a low-power state when applications running on the computer system and virtual device drivers (VxDs) registered on the computer system are in an idle state. When the CPU is in the low-power state, circuitry in the CPU is turned off and power consumption in the CPU drops to approximately 1 watt.

For an application to enter the idle state, it must voluntarily give control to the Windows® 3.1/95 operating system. This is normally done when the application calls a Windows® 3.1/95 blocking Application Program Interface (API), such as GetMessage or WaitMessage. Calls to these APIs tell the operating system to return to the application only when the application receives a message or an event to process. Once all applications have entered an idle state, the Windows® 3.1/95 operating system gives the VxDs in the computer system the opportunity to perform any necessary idle processing. The Virtual Machine Manager calls a list of pre-registered VxD idle callback addresses on an idle callback chain. After each VxD in the computer system has had the opportunity to complete performing idle processing, the VxD returns control to the Virtual Machine Manager. When all the VxDs in the idle callback chain are done with idle processing, the CPU is put to the low-power state to conserve power.

In order to prevent the computer system from being unresponsive, the Windows® 3.1/95 operating system allows a VxD to stop idle processing and return to service of the applications in the computer system after a period of idle processing by the VxD. The Windows® 3.1/95 operating system will only put the CPU in the low-power state when all applications and VxDs are in an idle state. Thus, by preventing idle processing from being completed and preventing being put into an idle state, a single VxD has the ability to contravene attempts by all the applications running in the computer system and all other VxDs registered on the computer system to facilitate power management.

Thus, what is needed is a method and apparatus for managing idle processing in the Windows® 3.1/95 operating system that prevents a single VxD from preventing the facilitation of power management.

SUMMARY OF THE INVENTION

A method for managing idle processing in a computer system is disclosed. An Idle Chain Manager virtual device driver (VxD) address is registered on an idle callback chain on the computer system. An Idle Chain Manager callback function corresponding to the Idle Chain Manager VxD address is hooked with an idle registration service on the computer system. This allows the Idle Chain Manager callback function to intercept a request from a VxD to register a VxD idle callback address onto the idle callback chain and registers the VxD idle callback address with the Idle Chain Manager callback function. The Idle Chain Manager VxD address is called when the idle processing is required. According to one embodiment of the present invention, the VxD idle callback address registered with the Idle Chain Manager callback function is called by the Idle Chain Manager and the CPU is put to a low-power state notwithstanding when a VxD callback function corresponding to the VxD idle callback address indicates that idle processing should not continue.

A method for managing an idle callback chain is disclosed. A virtual device driver (VxD) idle callback address is registered. A signal indicating that idle processing is to be performed is received. A VxD callback function corresponding to the VxD idle callback address is executed. A CPU is put in a low-power state when the VxD callback function indicates that the idle processing should not continue.

A computer system is disclosed. The computer system includes a bus. A memory is connected to the bus. A processor is connected to the bus. A Idle Chain Manager resides inside the processor. The Idle Chain Manager registers a virtual device driver (VxD) idle callback address on an idle callback chain. The processor executes a VxD callback function corresponding to the VxD idle callback address when idle processing is to be performed. The Idle Chain Manager puts the CPU in a low-power state when the VxD callback function indicates that idle processing should not continue.

BRIEF DESCRIPTION OF THE DRAWINGS

The present invention is illustrated by way of example and not by way of limitation in the figures of the accompanying drawings, in which the like references indicate similar elements and in which.

DETAILED DESCRIPTION

HARDWARE OVERVIEW

Figure 1:
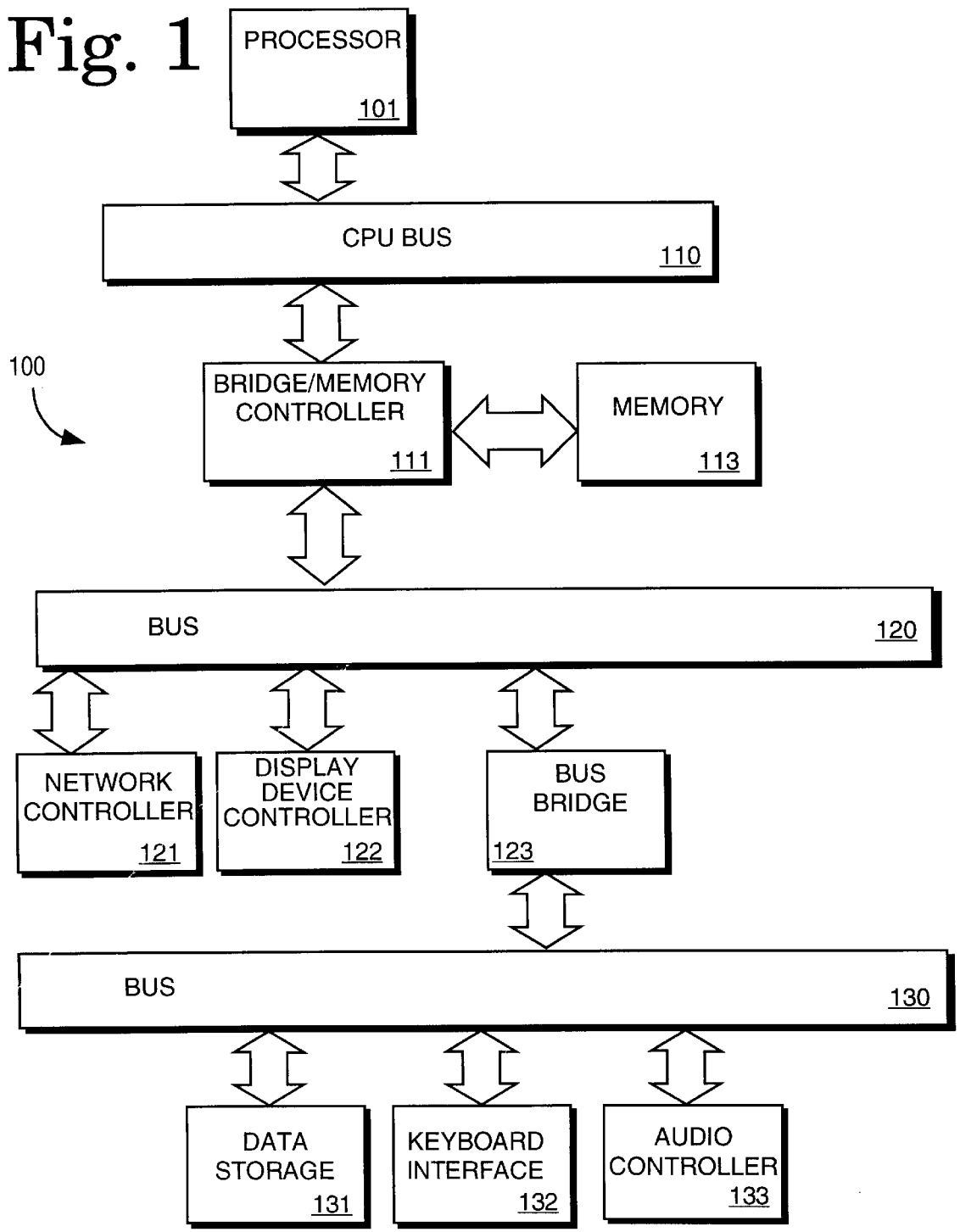
FIG. 1 illustrates a block diagram of a computer system implementing an embodiment of the present invention.

Referring to FIG. 1, an exemplary computer system upon which an embodiment of the present invention can be implemented is shown as 100. The computer system 100 comprises a processor or CPU 101 that processes digital data. The processor 101 can be a complex instruction set computing (CISC) microprocessor, a reduced instruction set computing (RISC) microprocessor, a very long instruction word (VLIW) microprocessor, a processor implementing a combination of instruction sets, or other processor device. The processor 101 is coupled to a CPU bus 110 that transmits signals between the processor 101 and other components in the computer system 100.

For the illustrated embodiment, a memory 113 comprises a dynamic random access memory (DRAM) device, a static random access memory (SRAM) device, or other memory devices. The memory 113 stores information or other intermediate data during execution by the processor 101. A bridge memory controller 111 is coupled to the CPU bus 110 and the memory 113. The bridge memory controller 111 directs data traffic between the processor 101, the memory 113, and other components in the computer system 100 and bridges signals from these components to a high speed I/O bus 120.

For the illustrated embodiment, the high speed I/O bus 120 supports peripherals operating at high data throughput rates. The bus 120 can be a single bus or a combination of multiple buses. As an example, the bus 120 can comprise a Peripheral Components Interconnect (PCI) bus, a Personal Computer Memory Card International Association (PCMCIA) bus, or other buses. The bus 120 provides communication links between components in the computer system 100. A network controller 121 links a network of computers together and provides communication among the machines. A display device controller 122 is coupled to the high speed I/O bus 120. The display device controller 122 allows coupling of a display device to the computer system and acts as an interface between the display device and the computer system 100. The display device receives information and data from the processor 101 through the display device controller 122 and displays the information and data to the user of the computer system 100.

In the illustrated embodiment, a bus bridge 123 couples the high speed I/O bus 120 to I/O bus 130. The bus bridge 123 comprises a translator to bridge signals between the high speed I/O bus 120 and the I/O bus 130. The I/O bus 130 is used for communicating information between peripheral devices that operate at lower throughput rates. The I/O bus 130 can be a single bus or a combination of multiple buses. As an example, the bus 130 can comprise an Industry Standard Architecture (ISA) bus, an Extended Industry Standard Architecture (EISA) bus or a Micro Channel Architecture (MCA) bus. The bus 130 provides communication links between components in the computer system 100. A data storage device 131 can be a hard disk drive, a floppy disk drive, a CD-ROM device, a flash memory device or other mass storage device. A keyboard interface 132 allows coupling of a keyboard to the computer system and transmits signals from a keyboard to the computer system 100. An audio controller 133 that operates to coordinate the recording and playing of sounds is also coupled to the I/O bus 130.

The present invention is related to the use of the computer system 100 to manage idle processing. According to one embodiment, managing idle processing is performed by computer system 100 in response to the processor 101 executing sequences of instructions contained in the memory 113. Such instructions may be read into the memory 113 from other computer-readable mediums such as data storage devices 131 or from the network. Execution of the sequences of instructions contained in the memory 113 causes the processor to manage idle processing, as will be described hereafter. In alternate embodiments, hard-wired circuitry may be used in place of or in combination with software instructions to implement the present invention. Thus, the present invention is not limited to any specific combination of hardware circuitry and software.

SOFTWARE OVERVIEW

Figure 2:
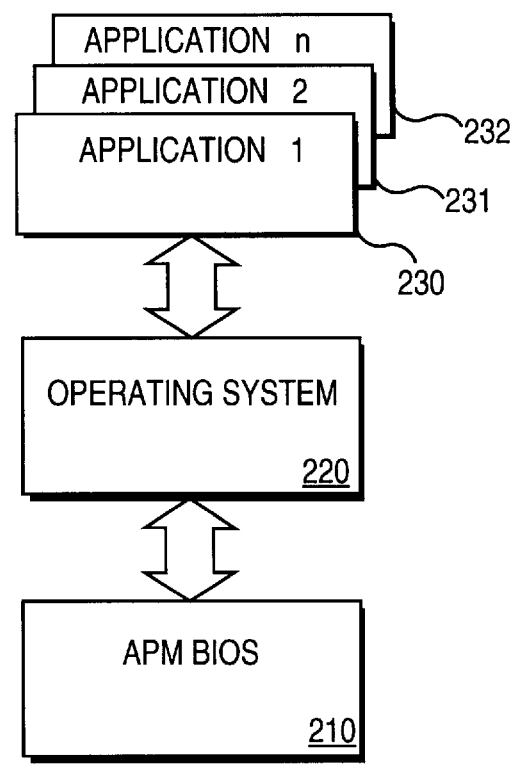
FIG. 2 illustrates a multi-layer power management architecture of a Windows® 3.1/95 operating system environment implementing an embodiment of the present invention.

Power management in a Windows environment is typically done cooperatively among three layers of software, as shown in FIG. 2. At the bottom-most software layer is the Advance Power Management (APM) BIOS 210. The APM BIOS 210 controls power to various system hardware components in the computer system 100 (not shown) such as the CPU or chipset for example. Above the APM BIOS 210 is the Windows® 3.1/95 operating system 220. At the top of the software stack are various applications 230–232 running on the system.

The APM BIOS 210 provides a system-independent interface for performing power management on computer systems. The specific way in which computer systems handle APM calls will vary among system implementations. For example, the APM BIOS 210 may handle certain built-in devices such as the video monitor, for example, differently from platform to platform. The APM BIOS 210 allows a power driver to request various device power activities.

Among the APM BIOS' specified functions is the "CPU_Idle" application program interface (API) call. The CPU_Idle API call allows the CPU to be placed into a low-powered state. The APM BIOS 210 normally does this by executing a "HLT" instruction that turns off selected internal circuitry in the CPU until an external interrupt is received by the CPU. When the internal circuitry in the CPU is turned off by the HLT instruction, the system is said to be in an idle state.

In APM-equipped systems, the Windows® 3.1/95 operating system power driver VPOWERD allows the APM BIOS to communicates with the operating system. This power driver is integrated into the core Virtual Machine Manager. VPOWERD exports several APIs that give the operating system access to the power saving features of the APM BIOS, including the CPU_Idle call. Whenever the Windows® 3.1/95 operating system detects that all loaded software, drivers, and the operating system itself are idle, the operating system makes a CPU_Idle call via VPOWERD. By this call, the operating system is said to be in the idle state and has given control to the APM BIOS to save power.

IDLE CALLBACK CHAIN

An idle callback chain comprises a list of VxD idle callback addresses corresponding to callback functions performed by the CPU whenever a Windows® 3.1/95 operating system kernel signals that the Windows® applications are idle and all other virtual machines are also idle. The callback functions can carry out any operation and can modify EAX, EBX, ECX, EDX, ESI, EDI, and flags. Typically, the VxD idle callback addresses on the idle callback chain correspond to VxDs registered on the computer system. According to one embodiment of the present invention, VxDs register addresses of callback functions onto the idle callback chain by calling a Virtual Machine Manager Call_When_Idle service.

Figure 3:
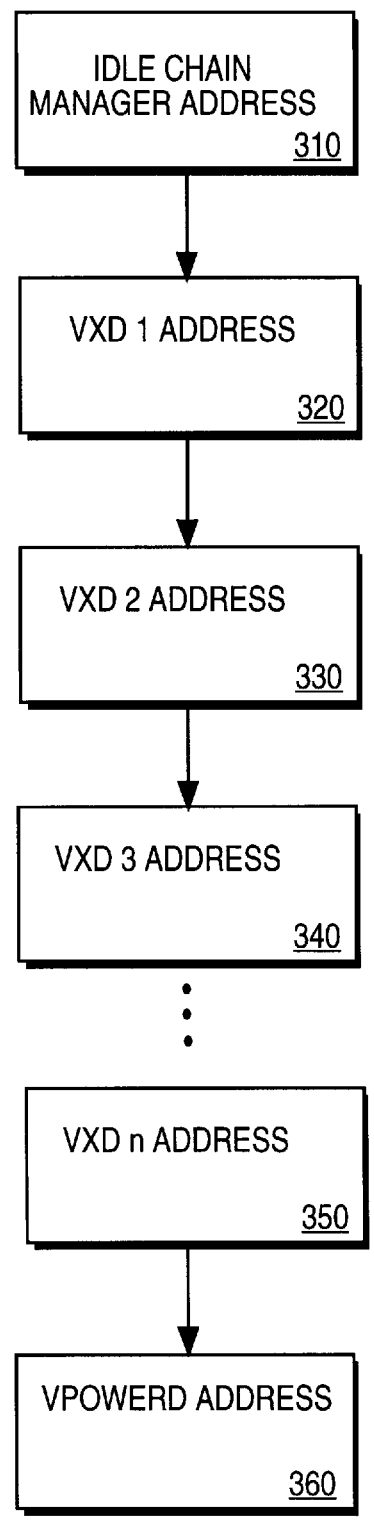
FIG. 3 illustrates the architecture of an idle callback chain according to an embodiment of the present invention.

FIG. 3 illustrates an exemplary architecture of an idle callback chain according to an embodiment of the present invention. Idle Chain Manager VxD address 310 is an address representing a callback function or a plurality of processing instructions corresponding to an Idle Chain Manager VxD. The Idle Chain Manager calls the Call_When_Idle service to register onto the idle callback chain. The Idle Chain Manager VxD address is registered on the idle callback chain early in the VxD initialization process by assigning the Idle Chain Manager VxD a low initialization order value so that it is given an early load order. The Idle Chain Manager VxD then calls the Virtual Machine Manager Hook_Device_Service service to replace the Call_When_Idle service of the virtual machine manager. Thus, subsequent VxDs wishing to register onto the virtual machine manager's idle callback chain by calling the Call_When_ Idle service will register onto an idle callback chain controlled by the Idle Chain Manager VxD instead of an idle callback chain controlled by the virtual machine manager.

Blocks 320–350 represent VxD idle callback addresses of callback functions corresponding to VxDs registered on the computer system. The VxDs may be virtual device drivers for a keyboard device, a disk controller, a programmable interrupt controller, or a direct memory access device, for example. Each of the callback functions is a plurality of processing instructions executed by the CPU as background processing. The VxD idle callback addresses 320–350 are registered on the idle callback chain by calling the Call_When_Idle service. Since the Idle Chain Manager hooked the Call_When_Idle service, VxD idle callback addresses 320–350 are registered with an idle callback chain controlled by the Idle Chain Manager VxD.

Block 360 represents a VxD idle callback address of a callback function, VPOWERD, that relates to power management. When executed, VPOWERD calls the APM BIOS with a CPU_Idle function code. This causes the APM BIOS to initiate power-saving processing such as executing a HLT instruction to place the CPU into a low-power state. In an alternate embodiment of the present invention, the Idle Chain Manager communicates with the APM BIOS directly and indicates that power-saving processing should be initiated without executing the VPOWERD callback function. In still an alternate embodiment of the present invention where an APM BIOS is not installed in the computer system, the Idle Chain Manager executes the HLT command directly to place the CPU into a low-power state.

IDLE CHAIN MANAGER

The Idle Chain Manager is a VxD that is called by the virtual machine manager whenever the computer system is prepared to perform idle processing. By registering early onto the virtual machine manager and hooking the Call_When_Idle service of the virtual machine manager, the Idle Chain Manager registers the VxD idle callback addresses of callback functions corresponding to other VxDs programmed to be registered onto the idle callback chain belonging to the virtual machine manager. By registering the VxD idle callback address of callback functions on its own idle callback chain, the Idle Chain Manager is able to manage idle processing for the Virtual Machine Manager.

Figure 4:
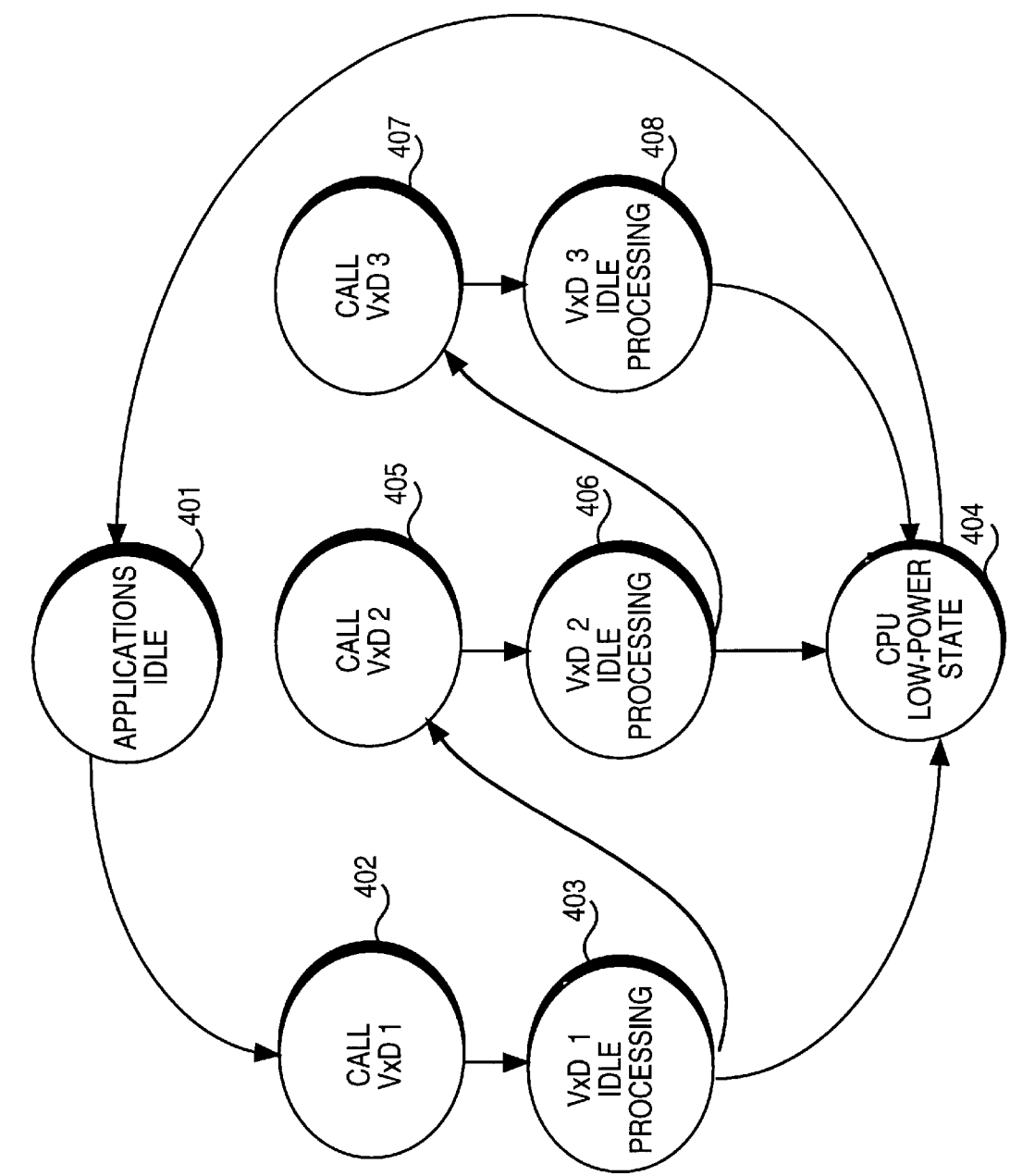
FIG. 4 is a state diagram illustrating the states defined by the idle chain manager.

FIG. 4 is a state diagram illustrating the states defined by one embodiment of the Idle Chain Manager according to the present invention. At state 401, the Idle Chain Manager is waiting for the applications running on the computer system to be idle, as signaled by an idle callback from the Virtual Machine Manager.

At state 402, the applications running on the computer system have become idle and the Idle Chain Manager calls the VxD idle callback address corresponding to VxD 1.

At state 403, the Idle Chain Manager allows the CPU to execute the callback function corresponding to VxD 1. If VxD 1 determines that the operation performed by the callback function requires more than a predetermined period of time, the operation is halted and the callback function clears a carry flag and returns to the Idle Chain Manager. In an alternate embodiment of the present invention, the operation is allowed to be completed before the callback function clears the carry flag and returns it to the Idle Chain Manager. If the callback function returns with the carry flag cleared, the Idle Chain Manager proceeds to state 404. If the callback function returns with the carry flag set, the Idle Chain Manager proceeds to state 405.

At state 404, the Idle Chain Manager puts the CPU in a low-powered state. As discussed above, this can be achieved by executing a VPOWERD callback function, communicating with the APM BIOS directly to indicate that power-savings processing should be initiated, or by executing the HLT instruction directly.

At state 405, the Idle Chain Manager calls the VxD idle callback address corresponding to VxD 2.

At state 406, the Idle Chain Manager allows the CPU to execute the callback function corresponding to VxD 2. If the operation performed by the callback function requires more than a predetermined period of time, the operation is halted and the callback function clears a carry flag and returns to the Idle Chain Manager. In an alternate embodiment of the present invention, the operation is allowed to be completed before the callback function clears the carry flag and returns it to the Idle Chain Manager. If the callback function returns with the carry flag cleared, the Idle Chain Manager proceeds to state 404. If the callback function returns with the carry flag set, the Idle Chain Manager proceeds to state 407.

At state 407, the Idle Chain Manager calls the VxD idle callback address corresponding to VxD 3.

At state 408, the Idle Chain Manager allows the CPU to execute the callback function corresponding to VxD 3. If the operation performed by the callback function requires more than a predetermined period of time, the operation is halted and the callback function clears a carry flag and returns to the Idle Chain Manager. In an alternate embodiment of the present invention, the operation is allowed to be completed before the callback function clears the carry flag and returns it to the Idle Chain Manager. If the callback function returns with the carry flag cleared, the Idle Chain Manager proceeds to state 404. If the callback function returns with the carry flag set, the Idle Chain Manager proceeds to state 404.

In an alternate embodiment of the Idle Chain Manager, instead of proceeding to state 404 whenever the carry flag is cleared, the Idle Chain Manager proceeds to call the VxD idle callback address of a callback function corresponding to a next VxD to perform further idle processing. When no next VxD exists, the Idle Chain Manager proceeds to state 404.

The Idle Chain Manager manages the execution of callback functions of the VxDs registered on the computer system when idle is signaled. If one of the callback functions indicates that further idle processing should be suspended, by clearing a carry flag, the Idle Chain Manager puts the CPU into a low-power state. In the past, the CPU was put into a low-power state only when all the applications and VxDs on the computer system were in an idle state. The Idle Chain Manager allows the computer system to save power while still performing idle processing substantially the same way as specified by the Windows® 3.1/95 operating system specification. The Idle Chain Manager may be implemented by any known technique.

Figure 5:
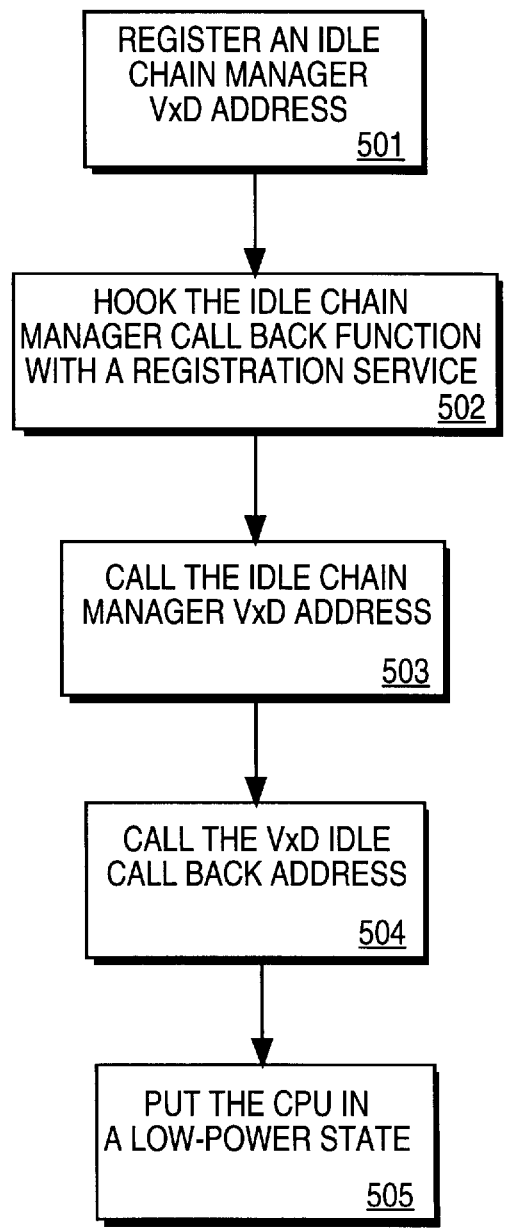
FIG. 5 is a flow chart illustrating a method for managing idle processing in a computer system.

FIG. 5 is a flow chart illustrating a method for managing idle processing in a computer system. At step 501, an Idle Chain Manager VxD address is registered on an idle callback chain on the computer system. According to one embodiment of the present invention, the step of registering the Idle Chain Manager VxD address comprises calling a Virtual Machine Manager Call_When_Idle service and assigning a low initialization order value to the Idle Chain Manager VxD.

At step 502, the Idle Chain Manager callback function hooks the Call_When_Idle registration service on the computer system. Hooking the registration service allows the Idle Chain Manager callback function to intercept a request from a VxD to register a VxD idle callback address onto the idle callback chain and registers the VxD idle callback address with the Idle Chain Manager callback function. According to one embodiment of the present invention, the step of hooking the Idle Chain Manager callback function with the registration service comprises calling a Hook_Device_Service service.

At step 503, the Idle Chain Manager VxD address is called by the virtual machine manager when idle processing is required. By calling the Idle Chain Manager VxD address, the Idle Chain Manager callback function is executed.

At step 504, the Idle Chain Manager callback function corresponding to the Idle Chain Manager VxD address calls the VxD idle callback address registered on the Idle Chain Manager callback function.

At step 505, a CPU in the computer system is put in a low-power state by the Idle Chain Manager callback function when a VxD callback function corresponding to the VxD idle callback address indicates that idle processing should not continue. According to one embodiment of the present invention, the CPU may be put in a low-power state by calling a VPOWERD VxD. According to an alternate embodiment of the present invention, the CPU may be put in a low-power state by instructing the APM BIOS to initiate power-saving processing. According to an alternate embodiment of the present invention, the CPU may be put in a low-power state by executing a HLT instruction.

Figure 6:
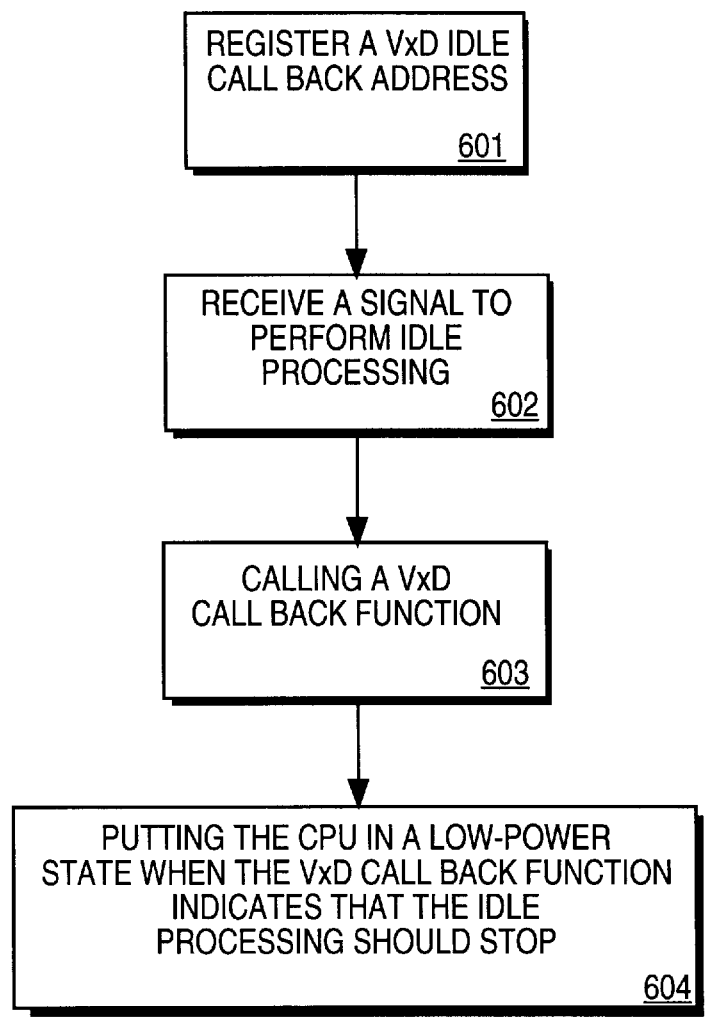
FIG. 6 is a flow chart illustrating a method for managing an idle chain.

FIG. 6 illustrates a method for managing an idle callback chain. At step 601, a VxD idle callback address is registered on the idle callback chain. According to one embodiment of the present invention, the step of registering the VxD idle callback address comprises the step of intercepting a request from a VxD to register with a virtual machine manager and registering the VxD idle callback address onto an idle callback chain controlled by an Idle Chain Manager.

At step 602, a signal indicating that idle processing is to be performed is received from the virtual machine manager.

At step 603, a VxD callback function corresponding to the VxD idle callback address is executed. According to an embodiment of the present invention, the VxD callback function is called by the Idle Chain Manager and executed by a CPU in the computer system.

At step 604, the CPU is put in a low-power state when the VxD callback function indicates that idle processing should not continue. According to one embodiment of the present invention, the CPU may be put in a low-power state by calling a VPOWERD VxD. According to an alternate embodiment of the present invention, the CPU may be put in a low-power state by instructing the APM BIOS to initiate power-saving processing. According to an alternate embodiment of the present invention, the CPU may be put in a low-power state by executing a HLT instruction.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing idle processing in a computer system, comprising:

registering an Idle Chain Manager virtual device driver (VxD) address on an idle callback chain in the computer system;

hooking an Idle Chain Manager callback function corresponding to the Idle Chain Manager VxD address with an idle registration service on the computer system to allow the Idle Chain Manager callback function to intercept a request from a VxD to register a VxD idle callback address onto the idle callback chain and register the VxD idle callback address with the Idle Chain Manager callback function; and calling the Idle Chain Manager VxD address when the idle processing is required.

2. The method of claim 1, further comprising the steps of:

calling the VxD idle callback address registered with the Idle Chain Manager callback function; and putting a CPU in the computer system in a low-power state notwithstanding when a VxD callback function corresponding to the VxD idle callback address indicates that the idle processing should not continue.

3. The method of claim 2, wherein the step of putting the CPU in a low-power state comprises the step of calling a VPOWERD VxD.

4. The method of claim 2, wherein the step of putting the CPU in a low-power state comprises the step of instructing an APM BIOS to initiate power-saving processing.

5. The method of claim 2, wherein the step of putting the CPU in a low-power state comprises the step of executing a CPU HLT instruction.

6. The method of claim 1, wherein the step of registering the Idle Chain Manager VxD address, comprises the step of calling a Call_When_Idle service.

7. The method of claim 1, wherein the step of hooking the Idle Chain Manager callback function with the idle registration service on the computer system comprises calling a Hook_Device_Service service.

8. A method for managing an idle callback chain, comprising:

registering a virtual device driver (VxD) idle callback address;

receiving a signal indicating that idle processing is to be performed;

executing a VxD callback function corresponding to the VxD idle callback address; and putting a CPU in a low-power state when the VxD callback function indicates that the idle processing should not continue.

9. The method of claim 8, wherein the step of registering the VxD idle callback address comprises the steps of:

intercepting a request from a VxD requesting to be registered on a virtual machine manager; and registering the VxD idle callback address onto the idle callback chain controlled by an Idle Chain Manager.

10. The method of claim 8, wherein the step of putting the CPU in a low-power state comprises the step of calling a VPOWERD VxD.

11. The method of claim 8, wherein the step of putting the CPU in a low-power state comprises the step of instructing an APM BIOS to initiate power-saving processing.

12. The method of claim 8, wherein the step of putting the CPU in a low-power state comprises the step of executing a CPU HLT instruction.

13. A computer-readable medium having stored thereon sequences of instructions, the sequences of instructions including instructions which, when executed by a processor, causes the processor to perform the steps of:

registering an Idle Chain Manager virtual device driver (VxD) address on an idle callback chain on a computer system;

hooking an Idle Chain Manager callback function corresponding to the Idle Chain Manager VxD address with a registration service on the computer system to allow the Idle Chain Manager callback function to intercept a request from a VxD to register a VxD idle callback address onto the idle callback chain and register the VxD idle callback address with the Idle Chain Manager callback function; and calling the Idle Chain Manager VxD address when idle processing is required.

14. The computer-readable medium of claim 13, further comprising instructions, which when executed by the processor, causes the processor to perform the steps of:

calling the VxD idle callback address registered with the Idle Chain Manager callback function; and putting a CPU in the computer system in a low-power state when a VxD callback function corresponding to the VxD idle callback address indicates that the idle processing should not continue.

15. A computer-readable medium having stored thereon sequences of instructions, the sequences of instructions including instructions which, when executed by a processor, causes the processor to perform the steps of:

registering a virtual device driver (VxD) idle callback address;

receiving a signal indicating that idle processing is to be performed;

executing a VxD callback function corresponding to the VxD idle callback address; and putting a CPU in a low-power state when the VxD callback function indicates that the idle processing should not continue.

16. The computer-readable medium of claim 15, wherein the step of registering the VxD idle callback address, comprises the steps of:

intercepting a request from a VxD requesting to be registered on a virtual machine manager; and registering the VxD idle callback address onto the idle callback chain controlled by an Idle Chain Manager.

17. A computer system, comprising:

a bus;

a memory, coupled to the bus;

a processor, coupled to the bus;

an Idle Chain Manager, inside the processor, that registers a virtual device driver (VxD) idle callback address on an idle callback chain that points to a VxD callback function that is executed by the processor when idle processing is to be performed, and puts the processor in a low-power state when the VxD callback function indicates that the idle processing should not continue.

18. An Idle Chain Manager, comprising:

a registration unit that registers a virtual device driver (VxD) idle callback address that points to a VxD callback function that is executed by a processor when idle processing is performed; and a low-power state initiator unit that puts the processor in a low-power state when the VxD callback function indicates that the idle processing should not continue.

19. The Idle Chain Manager of claim 18, further comprising an idle callback chain interface that interfaces the Idle Chain Manager with an idle callback chain in the processor.

20. The Idle Chain Manager of claim 18, further comprising a hooking mechanism that hooks the Idle Chain Manager with an idle registration service in the processor to allow the Idle Chain Manager to intercept a request from a VxD to register the VxD idle callback address onto the idle callback chain and registers the VxD idle callback address with the registration unit.

21. The Idle Chain Manager of claim 18, wherein the low-power state initiator puts the processor in a low-power state by calling a VPOWERD VxD.

22. The Idle Chain Manager of claim 18, wherein the low-power state initiator puts the processor in a low-power state by instructing an APM BIOS to initiate power-saving processing.

23. The Idle Chain Manager of claim 18, wherein the low-power state initiator puts the processor in a low-power state by executing a CPU HLT instruction.

* * * * *